3,339,739
LUBRICATION APPARATUS
Russell V. Dye, Liberty, Mo. 64068
Filed Feb. 4, 1963, Ser. No. 256,047
1 Claim. (Cl. 210—168)

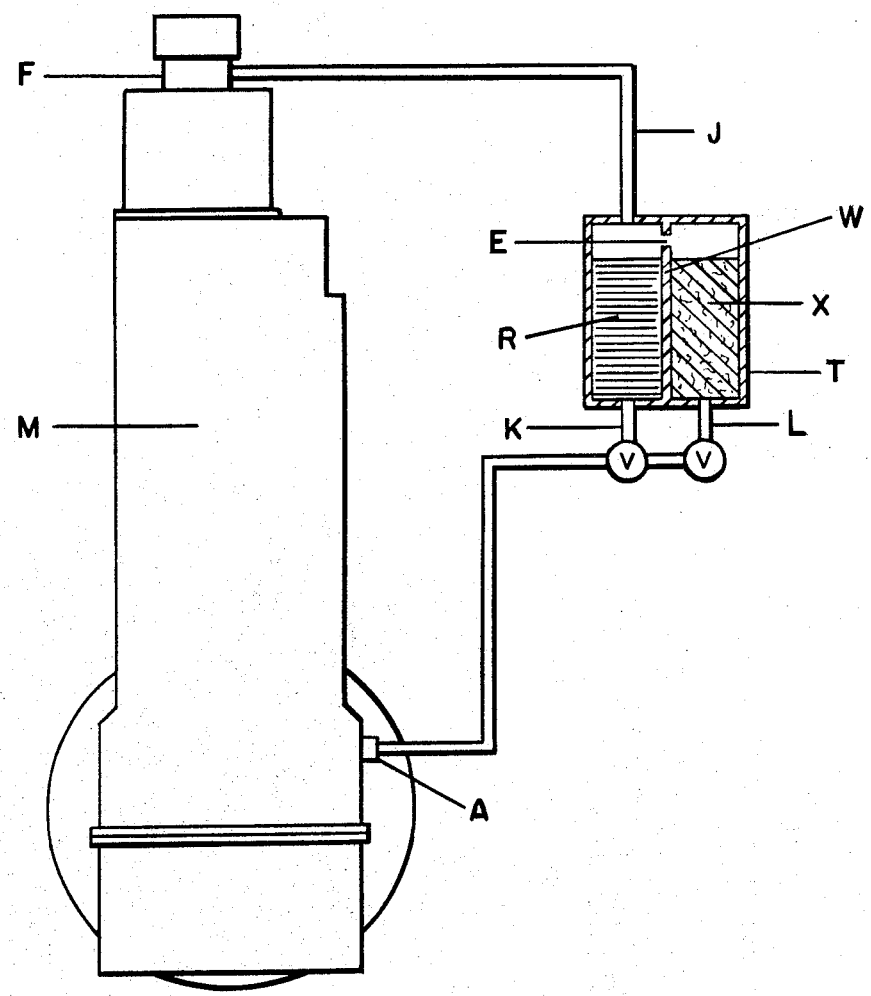

This invention relates to motor vehicle engines and more particularly, is an attachment to the crankcase oiling system of the usual pressure recirculation type.

The principal object of the invention is to provide a unitized apparatus for filtering and priming the oiling system, which may be mounted in place of the conventional oil filter.

With a unit of the present invention installed in place of the oil filter, the oil is filtered just as before. Additionally, when the engine is stopped, the apparatus returns oil to the supply line for a period. This tends to offset drainage which takes place into the sump and assists the existing system in providing initial oiling when the engine starts.

Another object lies in the simple character of the action of priming which is performed without moving parts.

Yet another object may be noted in the filling of the priming reservoir which is done promptly after the engine starts. The short runs and long stops of motor vehicle use make this desirable.

Other objects and advantages will be noted in the course of the detailed description which follows. Although only one form of the apparatus is described and illustrated, it is to be expressly understood that this invention is not limited to the form shown but is desired in the appended claim.

In reference to the annexed drawing, it will be noted that it is a schematic presentation of the invention which fairly exhibits its simple and effective character.

M is the motor block of an internal combustion engine of a motor vehicle and has the usual pressure oiling system. This comprises an oil pump with distribution pipes to various bearings, a sump below the crankshaft for return drippings, and such details as are common to this type of oiling system.

A is the customary outlet provided for attachment of an oil filter. It is connected by a short tube to:

T a small tank of two to four quarts capacity.
W is an internal subdividing wall in T creating two spaces.
X is a compartment containing oil filtering media.
R the other compartment is an oil reservoir.
E is a passageway for filtered oil from X to R.
J is a combined oil outlet and atmospheric air vent for T.
F is the usual filler-breather tube for replenishing oil.
K is an entry passageway for oil into R with adjustable orifice in the form of a valve, but may be a fixed orifice.
L is the entry passageway to X and here includes a check valve to prevent the return of sludge to the system.

In operation, oil flows through to K and L from A, mostly to L. Oil passes through filter X and into reservoir R and thence out pipe J into oil filler pipe F and into the sump. When motor M is stopped, reservoir R, having an atmospheric vent through J, starts a gravity flow in reverse through K and A into the oiling system. Additionally, since the reservoir R takes some time to empty, the motor has cooled and viscosity and capillary attraction trap more oil in the system than would remain in a hot motor.

Certain relationships shown in the drawing must be clearly understood. Reservoir R must be mounted above so much of the oiling system as it is desired to prime, usually the oil gallery to the main bearings. Outlet J must be of size and disposition to vent itself to the atmosphere and allow the hydrostatic head of oil in reservoir R to be established and force gravity reverse flow. If necessary the return and vent functions of J may be better served by dividing J into two separate lines, should configuration of the motor or its location in the vehicle make this desirable. K must have a size suited to require several hours to drain R, depending upon flow relationships of the oiling system in accepting oil from A. It will be noted that flow in two directions tends to clear K of obstructions. Also by directing the effluent from filter X through reservoir R it is promptly filled with oil, so that the operation is effective in a day of short runs and long stops.

Having thus described my invention, what I claim is:

In a motor vehicle engine lubricating system, a combined oil filter and oil primer comprising a tank mounted in an upper portion of said system whereby oil may flow by gravity from said tank to said system, said tank having a filter compartment containing filtering means and an oil reservoir, outlet conduit means connecting the top of said reservoir with the oil sump in said system, and first and second inlet conduit means connecting the bottoms of said reservoir and said filter compartment, respectively, in parallel flow relation with the pressure side of said system, said filter compartment communicating with the reservoir on the outlet side of the filter means, bidirectional flow restrictions means, said first inlet conduit means and an anti-drainback check valve positioned in said second inlet conduit means.

References Cited

UNITED STATES PATENTS

| 1,857,652 | 5/1932 | McKinley | 184—6 |
| 2,261,098 | 10/1941 | Wicks. | |
| 2,289,553 | 7/1942 | Root | 210—168 |
| 2,312,604 | 3/1943 | Thompson | 210—117 |
| 2,430,097 | 11/1947 | Bauer | 210—257 |
| 2,641,241 | 6/1953 | Skinner. | |
| 2,661,848 | 12/1953 | Gerhart. | |

REUBEN FRIEDMAN, *Primary Examiner.*

F. MEDLEY, *Assistant Examiner.*